United States Patent
Wang

(10) Patent No.: US 8,266,586 B2
(45) Date of Patent: Sep. 11, 2012

(54) APPLICATION DEVELOPMENT WITH UNIFIED PROGRAMMING MODELS

(75) Inventor: Kuansan Wang, Bellevue, WA (US)

(73) Assignee: Microsoft Corporation, Redmond, WA (US)

(*) Notice: Subject to any disclaimer, the term of this patent is extended or adjusted under 35 U.S.C. 154(b) by 1402 days.

(21) Appl. No.: 10/977,106

(22) Filed: Oct. 29, 2004

(65) Prior Publication Data

US 2006/0070086 A1 Mar. 30, 2006

Related U.S. Application Data

(63) Continuation of application No. 10/954,676, filed on Sep. 30, 2004.

(51) Int. Cl.
*G06F 9/44* (2006.01)
(52) U.S. Cl. .......... 717/116; 717/104; 717/117
(58) Field of Classification Search ............ 717/104, 717/116, 117
See application file for complete search history.

(56) References Cited

U.S. PATENT DOCUMENTS

| | | | |
|---|---|---|---|
| 5,724,589 A * | 3/1998 | Wold ........................... 719/318 |
| 5,950,006 A * | 9/1999 | Crater et al. ................. 717/140 |
| 6,078,325 A | 6/2000 | Jolissaint et al. ............ 345/349 |
| 6,145,120 A * | 11/2000 | Highland ..................... 717/106 |
| 6,182,277 B1 * | 1/2001 | DeGroot et al. ............. 717/115 |
| 6,381,734 B1 * | 4/2002 | Golde et al. ................. 717/165 |
| 6,385,646 B1 | 5/2002 | Brown et al. |
| 6,526,050 B1 | 2/2003 | Hebert et al. |
| 6,668,370 B1 * | 12/2003 | Harmon et al. ............. 717/125 |
| 6,671,875 B1 * | 12/2003 | Lindsey et al. ............. 717/129 |
| 6,718,533 B1 * | 4/2004 | Schneider et al. ........... 717/100 |
| 6,732,118 B2 * | 5/2004 | Hermann et al. .................... 1/1 |
| 6,738,797 B1 | 5/2004 | Martin |
| 6,804,339 B1 | 10/2004 | Hettish |
| 6,865,429 B1 * | 3/2005 | Schneider et al. ............. 700/86 |
| 6,993,124 B2 * | 1/2006 | Hettish ......................... 379/231 |
| 7,047,524 B1 * | 5/2006 | Braddock, Jr. ............... 717/136 |
| 7,146,479 B2 | 12/2006 | Li et al. ........................ 711/170 |
| 7,177,626 B2 | 2/2007 | Hintermeister et al. |
| 7,200,627 B2 | 4/2007 | Stickler ........................ 707/205 |
| 7,246,104 B2 | 7/2007 | Stickler ............................ 707/1 |
| 7,275,237 B1 * | 9/2007 | Schneider et al. ........... 717/108 |
| 2002/0184610 A1 * | 12/2002 | Chong et al. ................ 717/109 |
| 2003/0004951 A1 | 1/2003 | Chokshi ......................... 707/10 |
| 2003/0088593 A1 | 5/2003 | Stickler ........................ 707/205 |
| 2003/0145305 A1 * | 7/2003 | Ruggier ........................ 717/100 |
| 2003/0149799 A1 * | 8/2003 | Shattuck et al. ............. 709/318 |
| 2003/0233219 A1 | 12/2003 | Landers et al. ................ 703/14 |

(Continued)

OTHER PUBLICATIONS

Ecma International, ECMAScript Language Specification (ECMA-262), 3rd Edition, Dec. 1999.

(Continued)

*Primary Examiner* — Wei Zhen
*Assistant Examiner* — Matthew Brophy
(74) *Attorney, Agent, or Firm* — Steven M. Koehler; Westman, Champlin & Kelly, P.A.

(57) ABSTRACT

A unified programming environment allows application developers to work with declarative, procedural and service model based logic. In one aspect, instructions on a computer readable medium include at least one of a declarative logic module adapted to define an object and a procedural logic module adapted to define an object. A service model based logic module is adapted to define actions to be performed on the object with a reference to said at least one of the declarative and procedural logic module.

12 Claims, 6 Drawing Sheets

U.S. PATENT DOCUMENTS

| | | | |
|---|---|---|---|
| 2004/0107108 A1 | 6/2004 | Rohwer | |
| 2004/0230637 A1* | 11/2004 | Lecoueche et al. | 709/200 |
| 2005/0144621 A1* | 6/2005 | Millbery | 719/310 |
| 2005/0166182 A1 | 7/2005 | Wang | |
| 2005/0203898 A1 | 9/2005 | Boyer et al. | |
| 2006/0070081 A1 | 3/2006 | Wang | 719/316 |
| 2006/0070086 A1 | 3/2006 | Wang | |

OTHER PUBLICATIONS

Ecma International, ECMAScript $3^{rd}$ Edition Compact Profile, Jun. 2001.

Ecma International, Using ECMA-323 (CSTA XML) in a Voice Browser Environment (ECMA TR/85), Dec. 2002.

W3C, VoiceXML Specification, version 2.0, Mar. 2004.

Salt Forum, Speech Application Language Tags Specification, version 1.0, Jul. 2002.

K. Wang, "SALT: Spoken Language Interface for Web-based Multimodal Dialog Systems," in *Proc. ICSLP-2002*, Denver CO, Oct. 2002.

Ecma International, Common Language Infrastructure, $2^{nd}$ Edition, Dec. 2002.

Ecma International, C# Language Specification, $2^{nd}$ Edition, Dec. 2002.

K. Wang, "Implementation of a multimodal dialog system using extensible markup language," in *Proc. ICSLP-2000*, Beijing China, Oct. 2000.

K. Wang, "A plan based dialog system with probabilistic inferences," in *Proc. ICSLP-2000*, Beijing China, Oct. 2000.

K. Wang, Y. Wang, and A. Acero, "The use and acquisition of semantic language model," in *Proc. NAACL/HLT-2004*, Boston MA, May 2004.

W3C, Extensible Multimodal Annotation (EMMA) Markup Language, working draft, Mar. 2004.

C. Leggetter and P. Woodland, "Flexible speaker adaptation using maximum likelihood linear regression," in *Proc. EuroSpeech-95*, Madrid Spain, Aug. 1995.

J.-L Gauvain and C.-H Lee, "Maximum a posteriori estimation for multivariate Gaussian mixture observations of Markov chains," *IEEE Trans. Speech and Audio Processing*, vol. 2, No. 2, pp. 291-298, Apr. 1994.

X. Huang et al., "Whistler: A trainable text to speech system," in *Proc. ICSLP-96*, Philadelphia PA, Oct. 1996.

A. Acero, "Formant analysis and synthesis using hidden Markov models," in Proc. EuroSpeech-99, Budapest Hungary, Sep. 1999.

W3C, Speech Synthesis Markup Language, candidate recommendation, Dec. 2003.

Wang, Office Action mailed Nov. 27, 2007 for U.S. Appl. No. 10/954,676, filed Sep. 30, 2004, pp. 1-6.

Wang, Office Action mailed Jul. 30, 2008 for U.S. Appl. No. 10/954,676, filed Sep. 30, 2004, pp. 1-9.

Wang, Advisory Action mailed Oct. 10, 2008, for U.S. Appl. No. 10/954,676, filed Sep. 30, 2004, pp. 1-3.

Wang, Office Action mailed Dec. 5, 2008 for U.S. Appl. No. 10/954,676, filed Sep. 30, 2004, pp. 1-5.

Wang, Notice of Allowance mailed May 7, 2009 for U.S. Appl. No. 10/954,676, filed Sep. 30, 2004, pp. 1-7.

* cited by examiner

APPLICATION DEVELOPMENT WITH UNIFIED PROGRAMMING MODELS

CROSS REFERENCE TO RELATED APPLICATION

The present application is a continuation of and claims priority of U.S. patent application Ser. No. 10/954,676, filed Sep. 30, 2004, the content of which is hereby incorporated by reference in its entirety.

BACKGROUND OF THE INVENTION

The present invention relates to methods and systems for defining and handling user/computer interactions. In particular, the present invention relates to methods and systems unifying programming models, such as with telecommunication systems.

Computer Supported Telecommunication Applications (CSTA) is a widely adopted standard suite for global and enterprise communications. In particular, CSTA is a standard that specifies programmatic access and control of the telecommunication infrastructure. Software can be developed for a wide variety of tasks, ranging from initiating and receiving simple telephone calls to managing large scale multi-site collaborations via voice and video.

CSTA is standardized in a number of ECMA/ISO (ECMA International Rue du Rhône 114 CH-1204 Geneva, www.ecma-international.org) standards. The core operation model and the semantics of the CSTA objects, services and events are defined in ECMA-269. These CSTA features are defined in an abstract and platform independent way so that they can be adapted to various programming platforms. In addition, CSTA is accompanied with several standardized programming or protocol syntax, among them, ECMA-323 that defines the extensible markup language (XML) binding to CSTA commonly known as CSTA-XML, and ECMA-348, the Web Service Description Language (WSDL) binding. These language bindings, considered as part of the CSTA standard suite, insure maximum interoperability, making CSTA features available to computers running different operating systems through any standard transport protocols, including Transmission Control Protocol (TCP), Session Initiation Protocol (SIP), or Simple Object Access Protocol (SOAP).

Recently, CSTA has witnessed a strong adoption in the area of interactive voice services. This has been advanced in part by the publication by ECMA of TR/85, "Using ECMA-323 (CSTA XML) in a Voice Browser Environment," December 2002. Now, software agents, equipped with speech recognition and synthesis capabilities, can be deployed in call centers to provide automated services. The advantage being that businesses are based syntax for CSTA, while ECMA-348, specifies the syntax in WSDL.

However, in view of the different programming approaches that must be used, development is sure to be slowed. In particular, a developer or a team of developers must be fluent in both a service model programming as well as object oriented programming in order to develop or integrate applications. In view that a third programming approach, procedural, such as used in markup languages like HTML (HyperText Markup Language) or XML, is used in further features such as SALT (Speech Application Language Tags, the specification of which is widely available such as at www.saltforum.org), which provides speech/speech recognition capabilities to any XML application, integration and development is further complicated. Thus, a method or system that can address one or more of these problems would be beneficial.

SUMMARY OF THE INVENTION

A unified programming environment allows application developers to work with declarative, procedural and service model based logic. In one aspect, instructions on a computer readable medium include at least one of a declarative logic module adapted to define an object and a procedural logic module adapted to define an object. A service model based logic module is adapted to define actions to be performed on the object with a reference to said at least one of the declarative and procedural logic module.

Compilers can be provided to convert said at least one of declarative logic module and the procedural logic module, and the service model based logic module into a machine language readable by a processor. As another aspect, a method for compiling an application, includes identifying a designation within a service model based logic module corresponding to at least one of a declarative logic module and a procedural logic module; and accessing an object within said at least one of the declarative logic module and the procedural logic module to perform actions in the service model based logic model.

As yet another aspect, an application developer comfortable with one of service model or object model based programming, but not comfortable with the other can access the device/system and obtain the corresponding service model schema or object model therefrom that he/she is not comfortable with. An object model or service model schema is then generated from the obtained service model or object model, respectively. An interactive application can then be developed by the application developer in the programming model that he/she is comfortable with using the generated object model or service model schema. Operations of the interactive application are then converted to interface with the programming model the application developer was not comfortable with.

DETAILED DESCRIPTION OF ILLUSTRATIVE EMBODIMENTS

Various aspects of the present invention pertain to how a service model programming approach and an object model or declarative programming approach can be equated such that modules from each can be developed separately but can be compiled together and work seamlessly together. By further equating procedural and declarative programming models complete integration can be achieved. By way of example, however, separately and particularly inventive aspects of the invention will be explained in the context of CSTA systems as described in the background section above. Nevertheless, it should be understood that aspects of the invention can be equally applied to other similar applications.

The discussion below is based on ECMA-335 (Common Language Infrastructure, or CLI) that enables an object model specification in a platform agnostic and programming language independent manner. The sheer volume reflecting the rich functionality makes it impractical to enumerate all the features of CSTA. The present discussion will thus focus in the areas of call control and interactive voice services where the demand for CSTA object model seems to be particularly strong. Other areas of CSTA can be similarly modified.

Examples of well-known computing systems, environments, and/or configurations that may be suitable for use with the invention include, but are not limited to, personal computers, server computers, hand-held or laptop devices, multiprocessor systems, microprocessor-based systems, set top boxes, and programmable dialing applications. For instance, embodiments of the present invention can be implemented in association with a call routing system, wherein a caller identifies with whom they would like to communicate and the call is routed accordingly. However, other service model, object model and procedural programming embodiments can also benefit from aspects of the present invention such as applications that arrange travel or perform financial transactions. These and many others may be for instance based on service models, thus allowing object model programming and procedural programming to be seamlessly compiled together would enhance further development.

Exemplary Environment

Prior to discussing embodiments of the present invention in detail, an exemplary computing environment within which the embodiments and their associated systems can be implemented will be discussed.

Figure 1:
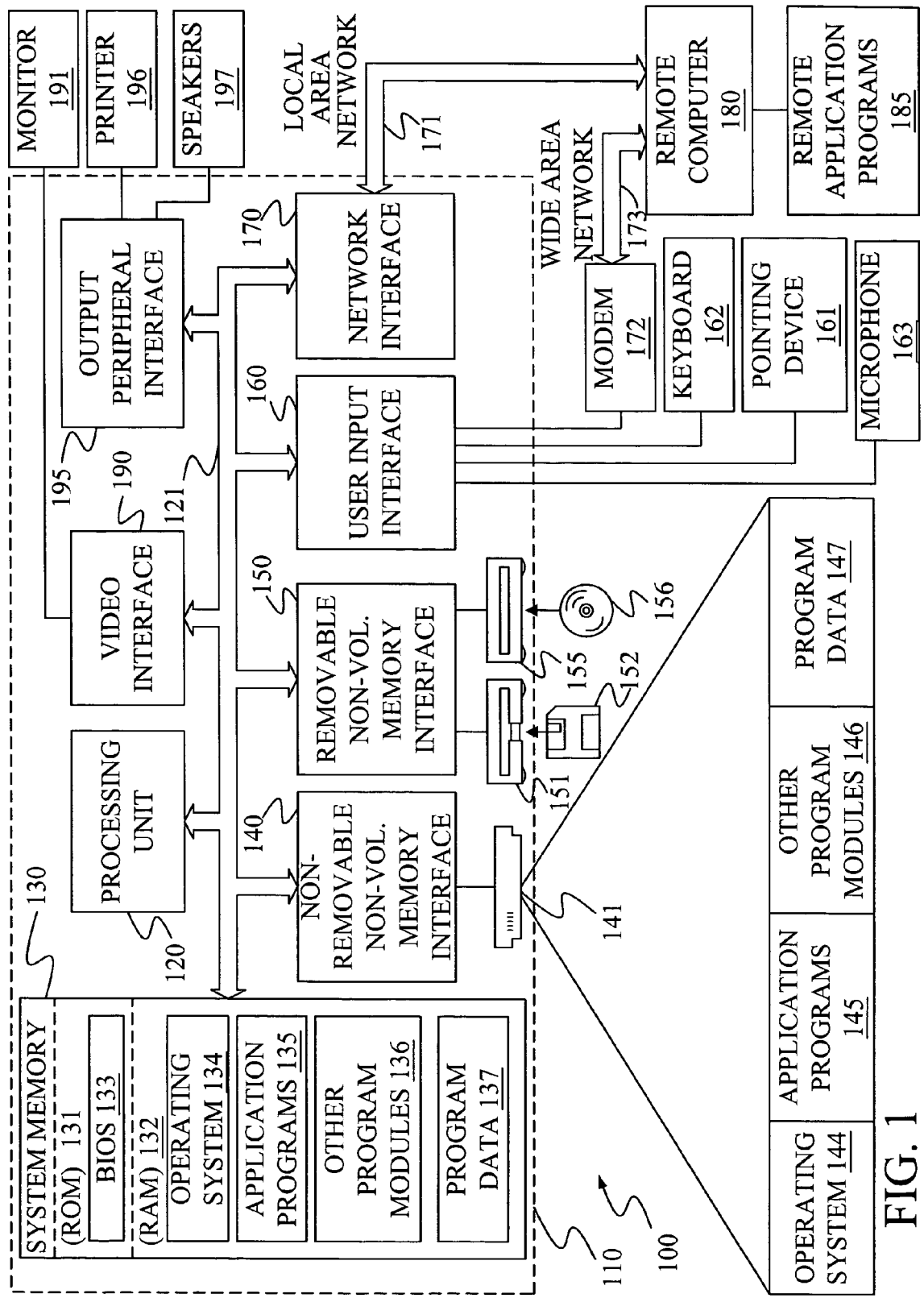
FIG. 1 is a block diagram of a computing system environment.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well-known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices. Tasks performed by the programs and modules are described below and with the aid of figures. Those skilled in the art can implement the description and figures as processor executable instructions, which can be written on any form of a computer readable medium.

With reference to FIG. 1, an exemplary system for implementing the invention includes a general-purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. For natural user interface applications, a user may further communicate with the computer using speech, handwriting, gaze (eye movement), and other gestures. To facilitate a natural user interface, a computer may include microphones, writing pads, cameras, motion sensors, and other devices for capturing user gestures. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

Brief Review of the CSTA Operational Model

A CSTA application can draw services from three CSTA sub-domains: Switching Function (SF), Computing Function (CF), and Special Resource Function (SRF). Typically, the CF implements the application logic, where the SF provides the infrastructure for the needed telecommunication functionality. A SRF is a feature add-on to the application that can be modelled as part of SF or CF. In a call centre, for example, the business procedures are often codified in and enforced by the CF software, whereas the call controls and computer telephony integration (CTI) are facilitated through service requests to the SF. If the call centre employs computer agents as call takers, the automatic speech recognition and synthesis services needed by the agents are SRFs because they can be provided as merely part of the CF, or as an integrated component of the SF.

It should be noted that although the rest of the discussion will focus on call controls and interactive voice services, they are just a category of services in CSTA, respectively. Examples of other categories of SF services include capability exchange (feature discovery) services, call routing services, services to control a device (e.g. message waiting, writing to display, forwarding settings), and many others. In addition to interactive voice, CSTA also offers a SRF governing the management of voice mail systems. These and other aspects are described in detail in ECMA-269, Services for Computer Supported Telecommunications Applications (CSTA) Phase III, 6th Edition by ECMA International, which is hereby incorporated by reference in its entirety. In addition, ECMA-323, XML Protocol for Computer Supported Telecommunications Applications (CSTA) Phase III, 3rd Edition; ECMA-348, Web Service Description Language (WSDL) for CSTA Phase III, 1st Edition; ECMA-335, Common Language Infrastructure (CLI), 2nd Edition; and ECMA-334, C# Language Specification, 2nd Edition; Technical Report TR/88 Designing an Object Model for ECMA-269 (CSTA) (June 2004) all by ECMA International are also incorporated by reference in their entirety, where references are provided below to these standards for the convenience of the reader.

Service versus Object Models

Initially, software has been developed using the service model, where reusable sequence of computer instructions are packaged into procedures or subroutines, each of which offers a specific service to the rest of the program. Usually, each service operates on a series of parameters (arguments) whose roles and the transformations inflicted upon them are well defined by the service. The service model is not limited to programs running on the same computer. The service, for example, can be offered from software in another computer connected through a network to the computer asking for the service. As a matter of fact, the majority of distributed processing protocols today are still specified in a service model.

A key feature of a service based programming model is that software designers adopt a "verb centric" way of thinking. This is because each service is often characterized as performing a transformation on its arguments, and the transformation can usually be named after a verb while its arguments can be considered nouns.

Grouping a sequence of operations into a packaged service is a special case of abstraction where software designers are allowed to create customized "verbs" to describe their application domains. The idea of grouping can be applied to data as well. There, relevant pieces of information can be grouped into a data structure and be thought of as an integrated entity. Similar in notion to the customized verbs, being able to define data structures allow the programmers to create customized nouns for their application domains. These customizations help bridge the gap between the programming model and the real world application, and therefore make the software easier to design, develop, and maintain.

As the software gets more sophisticated, it is becoming more challenging to keep a holistic view of the whole application domain. As a result, computer programs are increasingly made of well structured building blocks that, themselves, are computer programs composed of their own local services and data structures. Such a software design approach is reflected in the objected oriented programming style. An object is an encapsulation of a data structure and the associated services and operations that can be performed on the data. The objects serve as the building blocks of a program. An objected oriented programmer usually thinks in terms of what objects are involved in the application domain, and how their individual services can be collaborated to facilitate desired outcomes. Because objects often refer to things, object oriented programming has a "noun centric" way of thinking.

Encapsulation is a key concept to give rise to the strength and popularity of objected oriented programming. Modern programming environments have further advanced the notion of encapsulation to include not only the data and operations, but also the asynchronous responses of an object as well. ECMA-334 (C#), for example, is a programming language in the ECMA-335 (CLI) family that provides comprehensive supports for object oriented programming. While data and operations can be modelled as the properties and methods of an object, respectively, C# allows the asynchronous responses to be modelled as events of an object. Localizing events to the object level streamlines the software design process by alleviating the burden of tracking event sources from the programmers.

Although CSTA as well as other types of applications have been specified largely in the form of a service model, the underlying objects have been obtainable using aspects of the present invention. Again using CSTA by way of example, CSTA Switching Functions are defined in terms of the interplay of Call, Connection, and the Device, and CSTA Special Resource Functions, Voice Unit, Listener, Prompt, DTMF Parser, and Prompt Queue. This discovery lays a solid foundation for a CSTA object model because, in essence, the basic objects of CSTA have been clearly identified. An aspect of the present invention is to provide a method or mechanism to evolve the service model to the object model (and vice versa), while properly encapsulating the attributes, services, and/or events into these basic objects without departing significantly from the operational model already defined and widely implemented.

Harmonization of Service Model, Object Model and a Procedural Model

Figure 2:
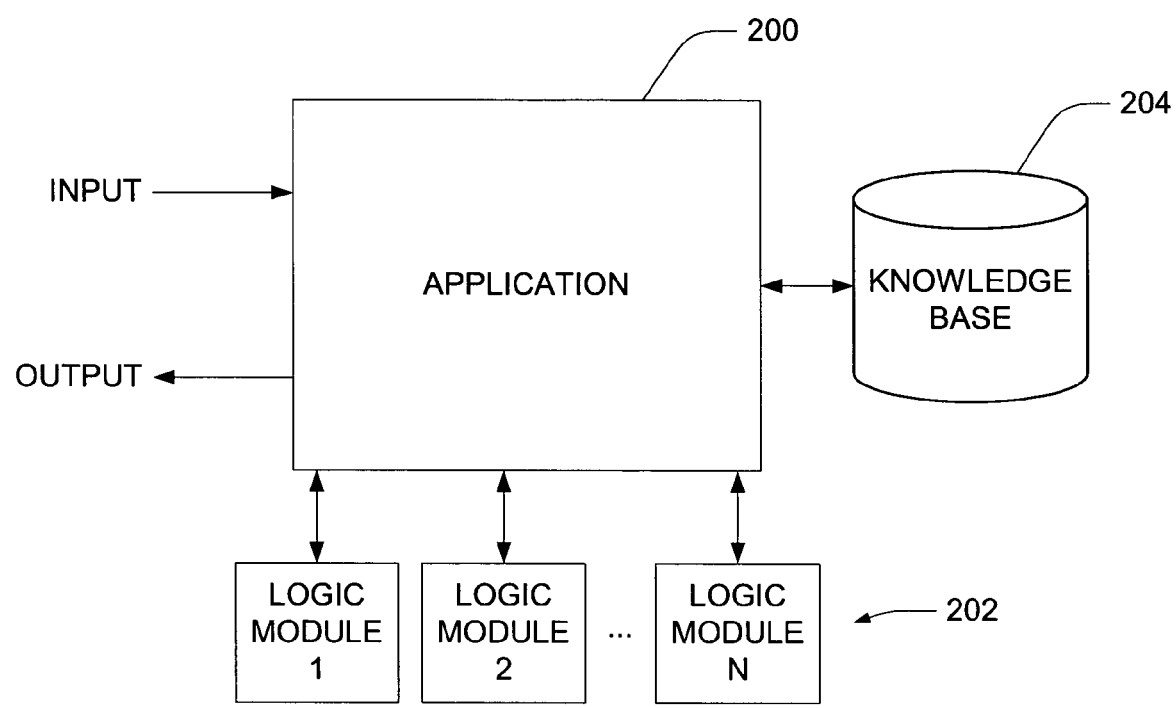
FIG. 2 is a block diagram of an application using a plurality of logic modules.

FIG. 2 is a simplified block diagram showing an application 200 such as a call control system that uses logic modules 202. Application 200 can operate on the exemplary environment discussed above in all its variations.

Logic modules 202 include procedural (e.g. markup language based), declarative (i.e. for object model), and service model programming code to enable application 200. For example, the code can be written using XML, HTML, LISP, Prolog, C, C++, C#, Java, SQL and/or Fortran to name just a few. The application 200 uses objects within the logic modules 202 to access information in a knowledge base 204. In one embodiment, the object provides one way of referring to an entity that can be utilized by one or more of the logic modules 202. A specific domain entity pertaining to a particular domain application can be identified by any number of different objects with each one representing the same domain entity phrased in different ways. The term object polymorphism can be used to mean that a specific entity may be identified by multiple objects. The richness of the objects, that is the number of objects, their interrelationships and their complexity, corresponds to the level of user expressiveness that an application would enable in the application. As an example of polymorphism "John Doe", "VP of NISD", and "Jim's manager" all refer to the same person (John Doe) and are captured by different objects PersonByName, PersonByJob, and PersonByRelationship, respectively.

Objects can also be nested and interrelated to one another including recursive interrelations. In other words, an object may have constituents that are themselves objects. For example, "Jim's manager" corresponds to an object having two constituents: "Jim" which is a "Person" semantic object and "Jim's Manager" which is a "PersonByRelationship" object. These relationships are defined by a schema that declares relationships among objects. In one embodiment, the schema is represented as a parent-child hierarchical tree structure. For example, a "SendMail" object can be a parent object having a "recipient" property referencing a particular person that can be stored in knowledge base 204. Two example child objects can be represented as a "PersonByName" object and a "PersonByRelationship" object that are used to identify a recipient of a mail message from knowledge base 204.

Using logic modules 202, knowledge base 204 can be accessed based on actions to be performed and/or the objects of the logic modules 202. As appreciated by those skilled in the art, knowledge base 204 can include various types and structures of data that can manifest themselves in a number of forms such as, but not limited to, relational or objected oriented databases, Web Services, local or distributed programming modules or objects, XML documents or other data representation mechanism with or without annotations, etc. Specific examples include contacts, appointments, audio files, video files, text files, databases, etc. Application 200 can then provide an output to the user based on the data in knowledge base 204 and actions performed according to one or more logic modules 202.

One aspect of the present invention allows logic modules 202 to be written using various languages including procedural, declarative and service model based languages. Thus, application developers can write source files that utilize different languages to best represent a particular task to be performed and thereby take advantage of features provided by each language. For example, an XML source file can include an object declaration, while a C# source file can include actions to be performed on the semantic object declared in the XML source file. Thus, a class definition can be "distributed" (i.e. accessible) across several source files that are authored in different languages. In one embodiment, source files can be implemented in a shared runtime environment such as Common Language Runtime (CLR).

Figure 3A:
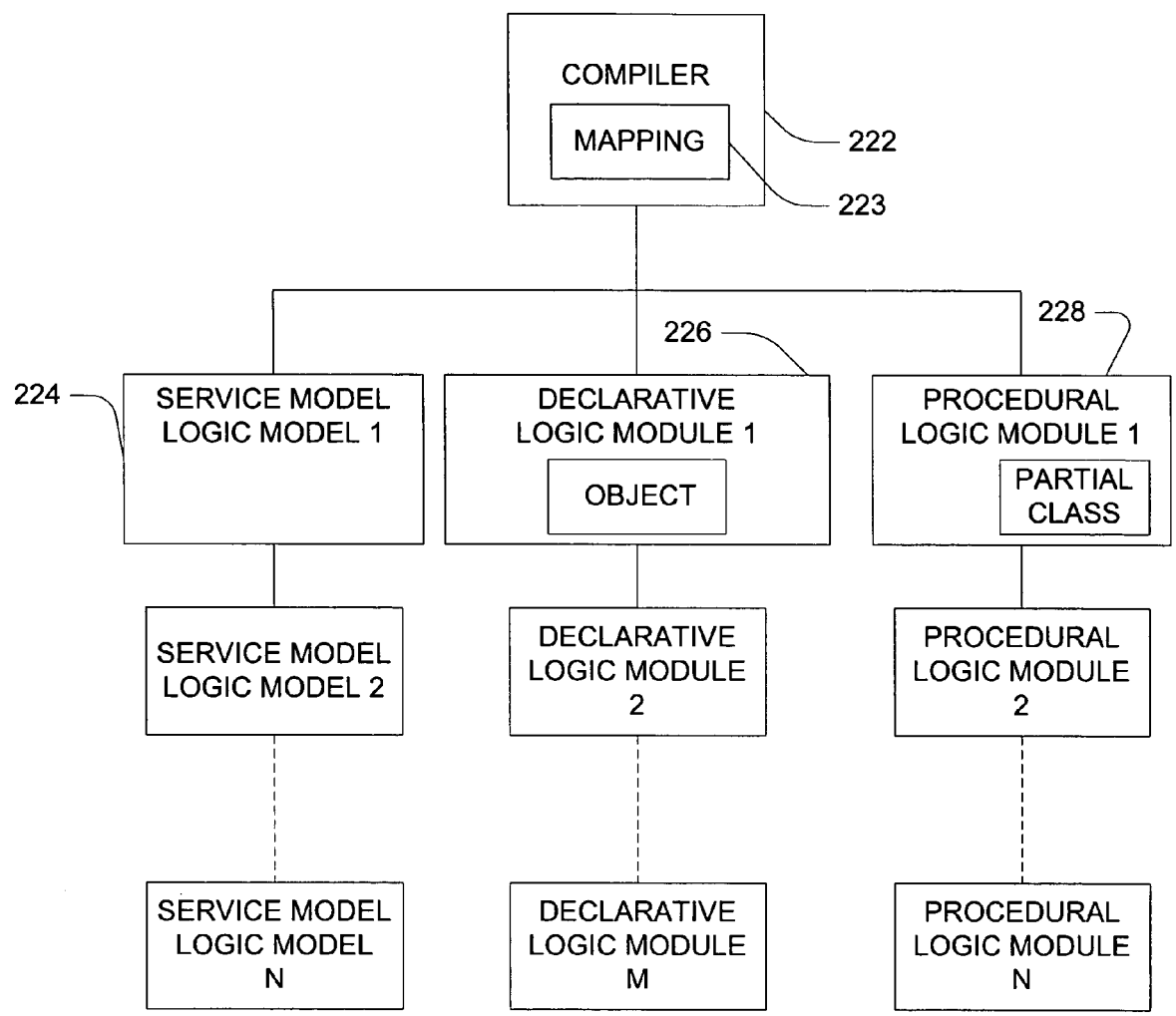
FIG. 3A is a simplified block diagram illustrating an interaction between a compiler, procedural logic modules, declarative logic modules and service model based logic modules.

FIG. 3A illustrates a framework for compiling logic modules written using procedural, declarative and service model based languages. A compiler 222 interprets code from at least one service model based logic module 224 and at least one declarative logic module 226 or at least one procedural logic module 228. In one embodiment, compiler 222 converts the code in each of modules 224 and 226 into a machine language readable by a processor. In a further embodiment, the compiler 222 interprets code at least one declarative logic module 226 and from at least one procedural logic module 228. Accordingly, the compiler 222 can compile instructions comprising at least one of a declarative logic module adapted to define an object, and a procedural logic module adapted to define an object; together with a service model based logic module adapted to define actions to be performed on the object with a reference to said at least one of the declarative and procedural logic module. The compiler 222 includes a mapping 223 to correlate the references between the various types of modules in spite of their different programming styles.

In general, a method for compiling an application, includes identifying a designation within a service model based logic module corresponding to at least one of a declarative logic module and a procedural logic module; and accessing an object within said at least one of the declarative logic module and the procedural logic module to perform actions in the service model based logic model. This can further include converting said at least one of the declarative logic module and the procedural logic module, and the service model based logic module into a machine language readable by a processor.

In yet a further embodiment, a plurality of service model based, declarative and procedural modules can also be used and compiled by compiler 222. For example, procedural logic module 224 can include coding for action(s) that are performed on an object defined in declarative logic module 226.

With respect to the relationship between declarative and procedural based modules, procedural logic module 224 includes a "partial class" designation. The partial class designation or reference notifies compiler 222 that the particular class is across multiple source files. The partial class encapsulates the imperative actions that define the behavior of the markup text. As a result, properties, methods and/or event handlers declared in declarative logic module 226 do not have to be repeated in the procedural logic module 224, and thus, compiler 222 will not suspend compiling because such properties, methods, event handlers, etc. are not present in procedural logic module 224.

The programming code below, written in XML, declares a class "Class1" of type "foo1" that includes at least one slot "Slot1" of type "foo2". Other slots and declarations can also be applied in this code depending on a particular application using "Class 1".

```
<Class1 type= "foo1">
    <Slot1 type= "foo2" max= "10"/>
    ...
</Class1>
```

Given that "Class1" has been declared above, a procedural programming module including code such as that provided below can then be written to access slots in "Class1". For example, the code below instantiates a partial class "Class1", which notifies compiler 222 that another source file contains the declaration for "Class1". The code below includes a place holder "noDoubt" for holding data that is used by the "Class1" procedures. As an example, "Slot1" in "Class1" is accessed by the procedure "Slot1.Count( )" provided below.

```
public partial class Class1 : SemObj {
    public SemObj noDoubt; // clearly a place holder,
    not a slot
    public void Evaluate ( ) {
        int size = Slot1.Count( ); // access Slot1
    defined in XML
    ... // foc    us on implementing domain logic here
        noDoubt = Slot1[0];
    }
}
```

Figure 3B:
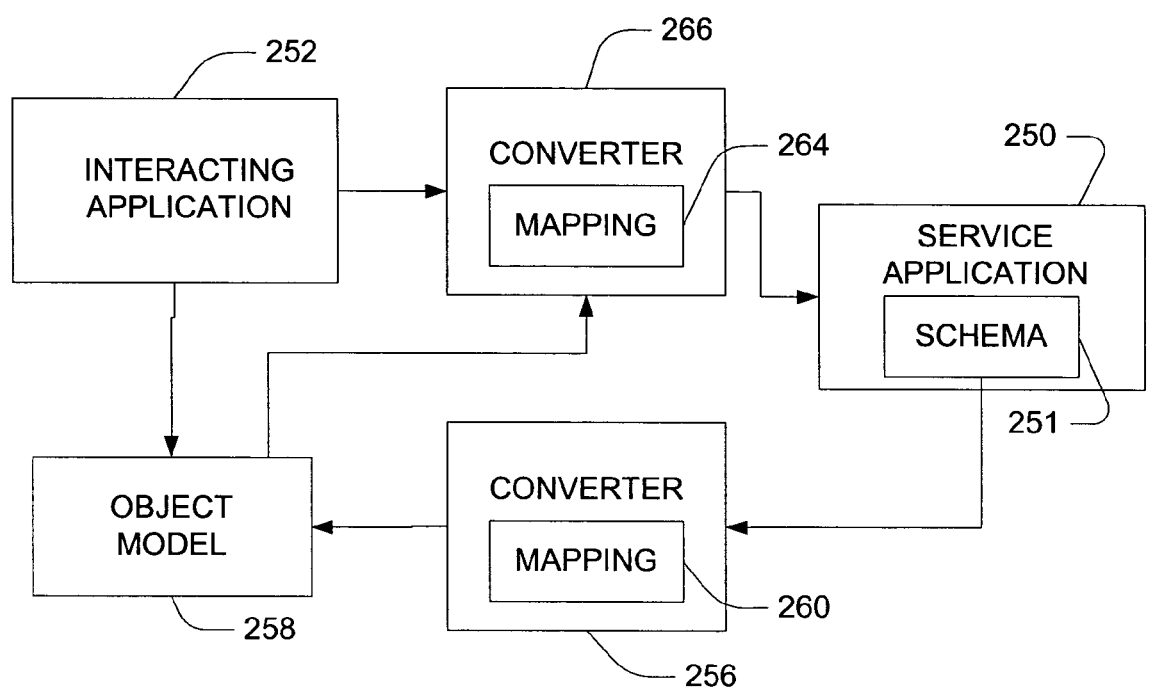
FIG. 3B is a simplified block diagram illustrating an interaction between a converter, a service application and an interacting application.

FIG. 3B illustrates a further environment for practicing aspects of the present invention. In this environment, suppose a service application 250 has been developed and is accessible and operable with service model based protocols. Furthermore, an application developer is desirous of accessing the service application 250 with an interacting application 252; however, the application developer prefers to develop the interacting application using an object model rather than a service model based application. In this aspect of the present invention, this is accomplished through the use of one or more converters implementing a mapping similar to that described above with respect to compiler 222.

In a first step, converter 256 receives the schema 251 for the service application 250 and converts the schema 251 to generate an object model 258 corresponding to the schema 251 of the service application 250. In particular, the converter 256 implements a mapping 260 to convert the schema 251 to the object model 258. As discussed above, the schema 251 of the service application is "verb centric", while the object model 258 is "noun centric." The converter 256 with the mapping 260 provides a mechanism to convert the schema 251 of the service application to obtain the object model 258 thereof.

With an object model 258 of the service application 250, the application developer can then develop interacting application 252 using the object model 258. Implementation of the interacting application 252 in order to interact with the service application 250 employs the use of converter 266 that receives the interacting application 252 (i.e. operations thereof) and the object model 258, and using a mapping 264 (similar to mapping 260, if not identical) will function as an interface between interacting application 252 and service application 250 so as to provide corresponding service model based operations for the service application 250. It should be noted that interacting application can be written using declarative and/or procedural based modules as discussed above. Furthermore, although illustrated and described above wherein interaction with the service application 250 is desirous, it should also be noted converter 256 can be used so as to receive an object model and generate a schema 251 if it is desirous that an interacting service based model application be developed to cooperate with an existing object model based application. Finally, separate converters 256, 266 are herein illustrated for purposes of understanding and should not be considered required or limiting in that a single converter can be used to perform both functions.

The CSTA Object Model

Returning back to the CSTA application by way of example, CSTA is the interface created for computer telephony integration. CSTA is a standard interface that provides a way for a device (e.g. computer) to communicate to another device (e.g. telephony switch) that is capable of controlling audio, video, and/or data traffic and connections, for example setting up calls. Although based on a service model heretofore, an object model will be presented and discussed in detail. Using the object model, an application developer not familiar or comfortable with the service model can control a CSTA service model based device like a telephony switch. With reference back to FIG. 3, object model 258 represents the CSTA object model discussed below, where the application developer can use object model 258 to develop an application 252 as discussed above to control a CSTA responsive switch (represented by service application 250). In a manner similar to that discussed above, converter 266 uses mapping 264 to provide an interface between application 252 and service model based device 250. In one embodiment, application 252, object model 258, converter 266 and mapping 264 comprise a system that can reside on a computer such as that illustrated and discussed above with respect to FIG. 1. Likewise, the service model application resides on a computing device similar to, or at least having components similar to the computer of FIG. 1. Further, it should be understood that computing device represented by service application 250 is not limited to a telephony switch but can comprise many types of network traffic control devices such as but not limited to network routing switches, servers and the like for use with audio, video, text, data and telefaxes to name but a few.

Figure 4:
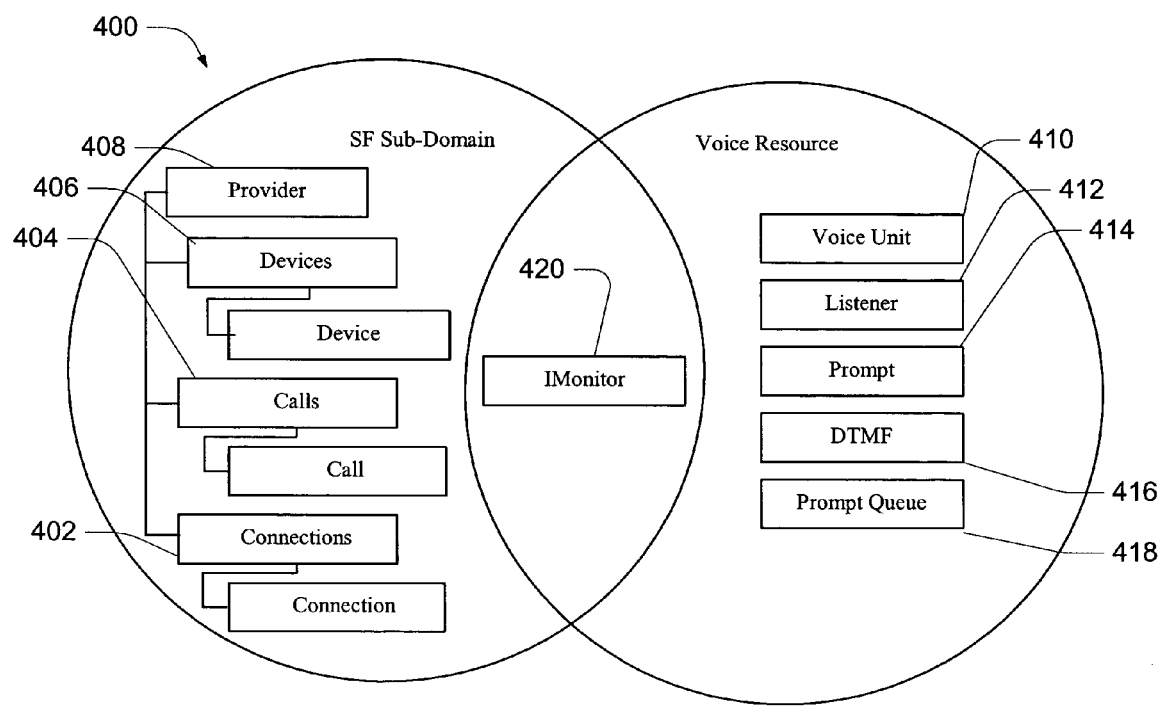
FIG. 4 is a pictorial representation of a hierarchy structure for CSTA object models.

The CSTA object model is intended to be utilized by CF. As such, the object model encompasses the SF and SRF sub domains. The objects to facilitate CSTA SF have been clearly specified (Clause 6.1, ECMA-269), namely, the CSTA Connections, Calls, and Devices. Referring to FIG. 4 which illustrates a schematic representation of the CSTA object model hierarchy 400, CSTA Connections 402, Calls 404, and Devices 406 are accessible through a CSTA Provider 408 that manages the collections and services surrounding these objects. In addition, the application can elicit services from Voice Resources, such as Voice Unit 410, Listener 412, Prompt 414, DTMF 416, and Prompt Queue 418 (Claus 6.1, ECMA-269).

CSTA Monitor 420 is a special object that enables event reporting. Monitor 420 can be placed, for example, on Device 406 or Call 404 objects to observe and keep track of the states of the objects. In addition, all the voice resource objects may raise events. Event monitoring is therefore a feature that objects from both SF and SRF domains will provide. Accordingly, CSTA Monitoring Services are modelled as a CLI interface that can be implemented by other objects.

CSTA Objects

The CSTA SF subdomain is modelled by the Provider object 408. The instantiation of a Provider object 408 establish the application association with CSTA, i.e., the constructors of the Provider object 408 will include the implicit/ explicit and client/system initiative association defined in Claus 7 of ECMA-269. Naturally, the Provider object 408 encapsulates the System wide Services and Events, including Get Switching Function Capabilities, Get Switching Function Devices (13.1.3 through 13.1.5, ECMA-269), and System Services (Claus 14, ECMA-269).

The Device object 406 models a CSTA device (6.1.3). A Device object 406 relates to a logical or physical entity and models the terminal point of a communication link. A CSTA device can receive or initiate communications. A telephone, a fax machine, an automatic call distributor, a predictive dialer, and a voice mail box are all examples of CSTA devices. Typically, applications do not instantiate the Device object 406 directly. Rather, instances of Device objects 406 are obtained through the Get Switching Function Devices Service from the Provider object 408. The Device object 406 provides operations directly related to CSTA devices, such as Get Logical/Physical Device Information (13.1.1 and 13.1.2), Snapshot Device (16.1.2), Physical and Logical Device Features (Claus 21, 22, 23), as well as device oriented call control operations like Alternate Call (17.1.2), Conference Call (17.1.9), Consultation Call (17.1.10), Group Pickup Call (17.1.14), Join Call (17.1.17), Make Call (17.1.18), Make Predictive Call (17.1.19), Single Step Transfer (17.1.25), and Transfer (17.1.26).

The Connection object 402 models a CSTA connection (6.1.5). This object captures the state and the media characteristics of the relationship between the Device object 406 and the Call object 404. Possible connection states include null, alerting, connected, or held, and the media characteristics can contain information such as voice or multimedia codec, directions of media stream such as duplex, one way or none (muted). As a result of keeping the connection states, the CSTA connection object is where most of the call control services (e.g., deflecting, conferencing or holding calls) are provided. Typically, applications do not instantiate the Connection objects 402 directly as they are often produced as the outcome of a CSTA service request. For instance, when an application makes an outbound call, the resultant Connection object is accessible through an argument in the Originated Event (17.2.14). Similarly, the application can obtain the Connection object 402 for an incoming call through the argument in the Delivered Event (17.2.5). The Connection object 402 also includes the Device object 406 and the Call object 404 for which relationship the CSTA connection represents. It contains the connection state, and offers most of the non device oriented call control services such as Accept Call (17.1.1), Answer Call (17.1.3), Clear Connection (17.1.8), Deflect Call (17.1.11), Hold Call (17.1.15), Intrude Call (17.1.16), and Single Step Conference (17.1.24).

The Call object 404 models a CSTA call (6.1.4) that contains call attributes such as user data, correlator data, and account or charging information. For historical reasons, a communication session is referred to as a CSTA Call. The Call object 404 is where session data, such as billing information, are stored. In many scenarios, it is often desirable that some user data can be moved along with a call so that customers do not have to repeat their personal information every time they are transferred to a new agent, for example. The CSTA call object is where the correlate data can be stored. Typically, applications do not instantiate the Call objects 404 directly. Instead, a Call object 404 is often obtained from the Connection object 402 that models the relationship of the call and the device. Call oriented operations include the Snapshot Call (16.1.1), Snapshot CallData (16.1.3), Clear Call (17.1.7), and Services in the Call Associated Features (18.1). Note that the Call object 404 may serve as a rich event source because CSTA allows call type monitoring. All the call-type monitoring events are raised on the Call object 404.

The voice resource objects are very well encapsulated in ECMA-269 already. The Voice Unit object 410 that manages voice mail has methods and events corresponding to Voice Unit Services and Events (26.1 and 26.2), while the Listeners 412, Prompt 414, DTMF 416, and Prompt Queue objects 418 have services and events described in Clause 26 of ECMA-269.

Services and Events

Services are defined as CSTA operations that can be used to observe and control objects in the CSTA SF or SRF domains. Although CSTA Services appear to have a global scope, the majority of them are indeed sponsored by a specific type of object, which often manifests itself as one of the mandatory objects in the service request parameter. As far as encapsulation is concerned, the service is associated with respect to its sponsoring object.

There are three categories of CSTA Services (Claus 9.1, ECMA-269):

SF Services, where SF is the server and CF is the client;
CF Services, where SF is the client and CF is the server;
SRF Services, where SRF is the server, and CF as the client; and
Bidirectional Services, where either the SF/SRF or the CF may be the client.

From the viewpoint of objected oriented design, the services for which the CF plays the client role are conventionally modelled as the methods of the objects, whereas requests for which CF is the server are usually modelled as call back functions. Following the style of CLI, it is reasonable to use the CLI event mechanism for call backs. In other words, both SF and SRF Services can be regarded as object methods and the CF Services, as CLI object events. A bidirectional service would be modelled with both a method and an event, preferably adhering to the naming conventions of ECMA-335, as appropriate.

CSTA Events are exclusively directed at CF. The Monitor cross reference id often serves as a good indicator as to which Device or Call object the event should be raised and, based on service requests, which type of event sequence will be generated. As a result, they are modelled as object events, with the event information being delivered in a System.EventArgs object. Since all the CSTA events include Event Cause, CSTASecurityData and CSTAPrivateData, a base class for all the CSTA events can be defined as:

```
public CSTAEventArgs: System.EventArgs
{
    EventCause         Cause;
    CSTASecurityData   Security;
    CSTAPrivateData    PrivateData;
}
```

The XML structure for these data can be defined in ECMA-323 Claus 9.7 and 9.18, and have a straightforward mapping to ECMA-335. For example, EventCause is an enumeration of CSTA event causes as follows:

```
public enum EventCause {
    ACDBusy, ACDForward, ... ,
    NewCall, NextMessage, ...
    UnknownOverflow};
```

Service Acknowledgements

All CSTA Service requests will receive negative acknowledgements if some of the parameters are invalid or the requests cannot be honoured. The type of errors that lead to a negative acknowledgements are defined in Claus 9.3 of ECMA-269. Similarly, the majority of service requests also receive positive acknowledgements, either in the atomic (9.2.1.1) or multistep model (9.2.1.2). While the former takes place immediately, the latter requires the computing function to monitor related events to verify the request's completion.

Since the service requests are modelled as object methods, it is straightforward to treat the negative acknowledgements as exceptions that applications can catch, and the immediate positive acknowledgements as the return value of the object method call.

Illustrative Examples for Call Controls

Figure 5:
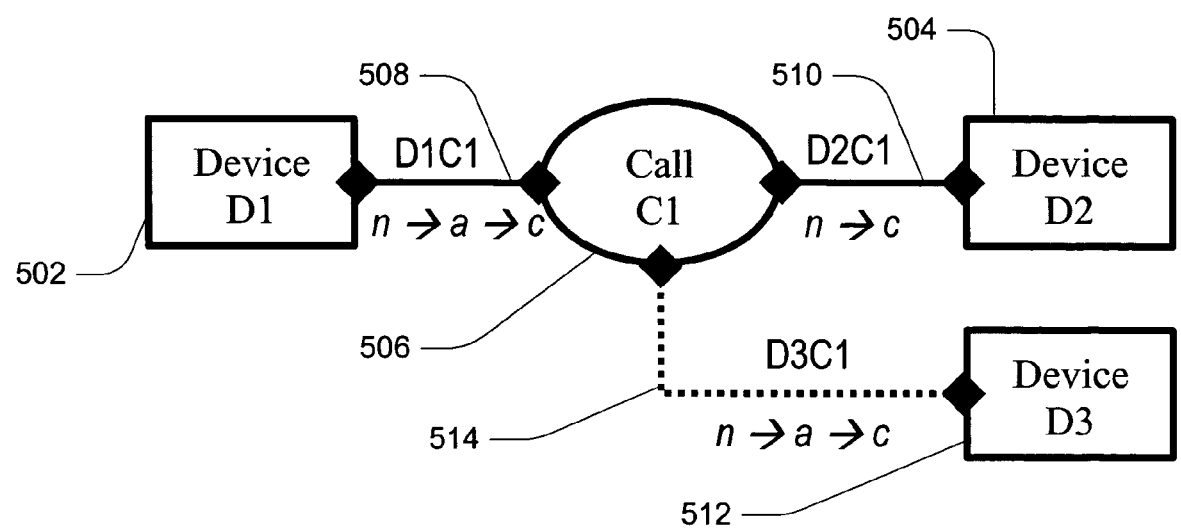
FIG. 5 is a pictorial representation of CSTA object models for a call.

It may be helpful to pictorially illustrate the interconnection of objects for the CSTA model. FIG. 5 illustrates the CSTA model of a user calling into an automatic speech service system on device D1 502. As the user initiates the call with device D2 504, the corresponding call C1 506 and connections D1C1 508 and D2C1 510 are created. The connection state for D2C1 510 is "connected," while the state for the recipient goes from alerting to connected after the automatic agent instructs D1 502 to accept the call. During the process, the monitor on D1 502 first raises a Delivered event that notifies the software agent of an incoming call. As the connection state transitions into "connected," the Established event is raised to signal the agent the media channel has been established.

When the software agent needs speech services, spoken language devices can be dynamically included into the call. To add a speech synthesizer 512, shown as device D3 in FIG. 5 for example, a conference service can be requested against D1C1. As a result, a new connection D3C1 514 is formed, with its connection state transitioning from "alerting" to "connected" as is the case for D1C1 508. The software agent can place a monitor on D3 512 or C1 506 to receive the Delivered and Established events.

This section provides further details regarding the example above as well as contrasting examples of ECMA-323 and the corresponding object model for call controls, with the same scope as ECMA TR/85, "Using ECMA-323 (CSTA-XML) in a Voice Browser Environment." Examples include:

starting a CSTA application with implicit association;
placing a monitor on a device;
notification of an inbound alerting connection;
answering an inbound alerting connection, notification of a connected connection;
clearing a connection, notification of a cleared connection;
initiating an outbound call;
call transfer scenario; and
conference scenario.

Starting a CSTA Application with Implicit Association

Before CSTA session can be started, application association must be first established. The implicit, CF initiative association is forged when the CF sends the Request System Status service request using an implicit transport mechanism to the SF. When the request is made by the CF, no mandatory parameter is required. The corresponding ECMA-323 based instance document can therefore be as simple as:

```
<RequestSystemStatus
    xmlns="http://www.ecma-
    international.org/standards/ecma-323/csta/ed3"/>
```

Typically, the service provider will return the system status, upon which the application association is considered established. The system status may further indicate whether the system is disabled or enabled and ready to offer CSTA services. Claus 12.2.25 of ECMA-269 provides further descriptions of the system status values.

The same application association can be achieved in the object model by instantiating the Provider object 408 which will supply proper constructors for possible means of associations. In this example, the sample C# code is:

```
CSTA.Provider myProvider;
try {
    myProvider = new CSTA.Provider( );
    ... // myProvider.SystemStatus has the status
} catch (...) {
    // handle negative acknowledgement here
}
```

The simple constructor will send the Request System Status service request, and store the system status as a property of the Provider object 408 for future reference.

Without the loss of generality and clarity, the following examples will omit the XML and the C# namespace declarations (xmlns and CSTA in the above example) and the exception handling for negative acknowledge for a terse presentation.

Placing a Monitor on a Device

In order to perform call controls, the application must obtain CSTA devices as the operating units. A CSTA device may be obtained using the Get Switching Function Devices service. Without any parameters, the service returns a list of available devices on the SF. The following example, however, demonstrates how a specific device can be requested if the device ID has been given to the application. The service request in ECMA-323 based instance document for obtaining a device is:

```
<GetSwitchingFunctionDevices>
    <requestedDeviceID>12345</requestedDeviceID>
</GetSwitchingFunctionDevices>
```

The positive response in ECMA-323

```
<GetSwitchingFunctionDeviceResponse>
    <ServiceCrossRefID>xxx</ServiceCrossRefID>
</GetSwitchingFunctionDeviceResponse>
``` returns the correlator to associate the subsequent SF service request. The correlator can be encapsulated into the Provider object so as to minimize the management efforts for the application developers.

The corresponding C# code can therefore be:
myDevice=myProvider.GetDevice("12345");

Device type monitoring is very useful for CSTA applications. It enables the application to be notified with the current states of the SF through CSTA events. In order to do so, a monitor must be placed on the device by using the Montor Start service request. The mandatory parameter for the service request is a device ID, and the corresponding ECMA-323 instance document is

```
<MonitorStart>
    <MonitorObject>
        <deviceObject>12345</deviceObject>
    </MontiorObject>
</MonitorStart>
```

The service response returns a cross reference ID for the monitor:

```
<MonitorStartResponse>
    <monitorCrossRefID>xxx</monitorCrossRefID>
</MonitorStartResponse>
```

As in the case of the service correlator, the Monitor cross reference ID can be encapsulated in the Device object 406 where the Monitor is placed. By implementing the IMonitor interface, the Device object 406 has the method to start the monitor, as in the following example:
myDevice.MonitorStart( );

Note that starting the monitor will cause CSTA events to be reported immediately. As a result, it is advisable in the object model programming to first attach the event handlers (see following sections for examples) before starting the monitor.

Notification of an Inbound Alerting Connection

When an inbound call arrives, the CSTA Delivered event is reported with a rich information about the caller such as ANI and DNIS. Most importantly, the event also reports the connection ID created by the system to answer the call with.

The ECMA-323 based instance document of a Delivered event looks like the following:

```
<DeliveredEvent>
    <monitorCrossRefID>xxx</monitorCrossRefID>
    <connection>
        <callID>xxx</callID>
        <deviceID>12345</deviceID>
    </connection>
    <alertingDevice>
        <deviceIdentifier>12345</deviceIdentifier>
    </alertingDevice>
    <callingDevice>
        <deviceIdentifier>14085551212<
            /deviceIdentifier>
    </callingDevice>
    <calledDevice>
        <deviceIdentifier>12345</deviceIdentifier>
    </calledDevice>
    <lastRedirectionDevice>
        <notRequired/>
    </lastRedirectionDevice>
        <localConnectionInfo>alerting<
            /localConnectionInfo>
    <cause>newCall</cause>
    <networkCallingDevice>
        <deviceIdentifier>14085551212<
            /deviceIdentifier>
    </networkCallingDevice>
    <networkCalledDevice>
        <deviceIdentifier>18001234567<
            /deviceIdentifier>
    </networkCalledDevice>
    <associatedCallingDevice>
```

```
        <deviceIdentifier>023</deviceIdentifier>
    </associatedCallingDevice>
</DeliveredEvent>
```

For the object model, this event is raised at the Device object 406 that is at the endpoint of an alerting connection for inbound call, or the device that makes the outbound call. The handler is attached as follows to receive the event:

myDevice.Delivered+=new DeliveredEventHandler(onDelivered);

where myHandler, following the CLI convention, is a function that has the signature:

void onDelivered(object sender, DeliveredEventArgs args)

The information carried by this event is available in the event argument DeliveredEventArgs:

```
public class DeliveredEventArgs : CSTAEventArgs
{
    CSTA.Connection Connection;
    CSTA.Device AlertingDevice;
    CSTA.Device CalledDevice;
    CSTA.Device CallingDevice;
    CSTA.Device LastRedirectionDevice;
    CSTA.Device NetworkCallingDevice;
    CSTA.Device NetworkCalledDevice;
    CSTA.Device AssociatedCallingDevice;
    ...
}
```

In the above example, when an incoming call arrives, myHandler will be called, and the calling device and the connection, for example, can be programmatically read out from args.CallingDevice and args.Connection, respectively.

Answering an Inbound Alerting Connection

After the application is notified an incoming call, the Answer Call service can be used to answer the call. The mandatory parameter for the service request is the connection ID. The service request in ECMA-323 based instance document can be:

```
<AnswerCall>
    <callToBeAnswered>
        <callID>xxx</callID>
        <deviceID>12345</deviceID>
    </callToBeAnswered>
</AnswerCall>
```

There is no mandatory parameter in the service response. Therefore, the positive acknowledgement in ECMA-323 based instance document can be as simple as <AnswerCallResponse/>

For the object model, the Answer Call service is available as a method on the Connection object 402 which logically follows the CSTA modelling concept and encapsulates the connection ID as an inseparable pair of a device ID and a call ID. Continuing the example in "Notification of an inbound alerting connection", the equivalent C# code may be:

```
Connection myConnection;
...
void onDelivered(object sender, DeliveredEventArgs
    args)
```

```
{
    myConnection = args.Connection;
    ... // other processing on the incoming call
    if (myConnection.LocalConnectionState
        ==Connection.ConnectionStage.Alerting)
    myConnection.AnswerCall( );
}
```

Clearing a Connection

Once an application is done with a call, it can hang up the phone by sending Clear Connection service request.

a. Service Request

The mandatory parameter for Clear Connection is the connection ID. In ECMA-323 based instance document, this appears as

```
<ClearConnection>
    <connectionToBeCleared>
        <callID>xxx</callID>
        <deviceID>12345</deviceID>
    </connectionToBeCleared>
</ClearConnection>
```

The service response has no mandatory parameter. The ECMA-323 based instance document can therefore be as simple as:

<ClearConnectionResponse/>

The service is modelled as a method on the Connection object. The above ECMA-323 snippets are equivalent to myConnection.ClearConnection( );

b. Notification of a Cleared Connection

When the telephony platform finishes clearing the connection, it sends the CSTA Connection Cleared event. The event is reported through the monitors placed on the call, or on the devices involved in the call. For either case, the ECMA-323 based instance document is:

```
<ConnectionClearedEvent>
    <monitorCrossRefID>99</monitorCrossRefID>
    <droppedConnection>
        <callID>1</callID>
        <deviceID>12345</deviceID>
    </droppedConnection>
    <releasingDevice>
        <deviceIdentifier>12345</deviceIdentifier>
    </releasingDevice>
    <cause>normalClearing</cause>
</ConnectionClearedEvent>
```

Following the previous example for the object model, the event will be reported on the releasing device if an event handler has been attached:

```
myDevice.ConnectionCleared +=
    new ConnectionClearedEventHandler(onHangUp);
...
void onHangUp(sender object,
    ConnectionClearedEventArgs args)
{ ... }
```

The ClearedConnectionEventArgs consists of the following information:

```
public class ConnectionClearedEventArgs :
CSTAEventArgs
{
    Connection DroppedConnection;
    Device    ReleasingDevice;
    ...
}
```

In this example, args.RelasingDevice will be the same as myDevice, and args.Cause will be equal to CSTA.EventCause.NormalClearing.

Note that the Connection Clear event will also be raised if the far end hangs up the phone, for which case the args.ReleasingDevice will not be the same as myDevice.

Initiating an Outbound Call

The Make Call service can be used to initiate an outbound call. The mandatory parameters are the device IDs of the call initiating and the targeted recipient devices. Note that by default, the connection even to the calling device is not automatically answered unless an optional parameter autoOriginate is set to "do not prompt."

a. Service Request

In ECMA-323 based instance document, the Make Call service with do not prompt option can be issued as

```
<MakeCall>
    <callingDevice>12345</callingDevice>
    <calledDirectoryNumber>18005551212</calledDirectoryNumber>
    <autoOriginate>doNotPrompt</autoOriginate>
</MakeCall>
```

The service response returns the initial connection created by the service:

```
<MakeCallResponse>
    <callingDevice>
        <callID>xxx</callID>
        <deviceID>12345</deviceID>
    </callingDevice>
</MakeCallResponse>
```

The corresponding service is available as the object method on the calling device:
myInitialConnection=myDevice.MakeCall
    ("18005551212", AutoOriginate.DoNotPrompt);
where AutoOriginate is an enumeration as:
    public enum AutoOriginate {Prompt, DoNotPrompt};

b. Outbound Call Event Sequence

An outbound call usually involves a series of events that report the progress of the call, including Originated, Network Reached, Delivered and Established events. Applications may choose only to handle some but not all of these events.

b.1. Originated Event

The event indicates the call is being made, which is useful especially the default Make Call behaviour for the calling device is prompt to connect. The mandatory parameters for this event are the called and calling device IDs, the monitor cross reference ID, the originated connection ID, and the event cause, which in ECMA-323 based instance document appears as

```
<OriginatedEvent>
    <monitorCrossRefID>99</monitorCrossRefID>
    <originatedConnection>
        <callID>xxx</callID>
        <deviceID>12345</deviceID>
    </originatedConnection>
    <callingDevice>
        <deviceIdentifier>12345</deviceIdentifier>
    </callingDevice>
    <calledDevice>
        <deviceIdentifier>18005551212</deviceIdentifier>
    </calledDevice>
    <cause>makeCall</cause>
</OriginatedEvent>
```

In C#, the corresponding structure can be modelled as

```
public OriginatedEventArgs: CSTAEventArgs
{
    Connection OriginatedConnection;
    Device    CallingDevice;
    Device    CalledDevice;
    ...
}
``` b.2. Networked Reached Event

When the target recipient is outside the CSTA domain, the Networked Reached event will be raised when the call reaches the network interface. In addition to the common monitor cross reference ID, the caller's and recipient's device IDs, the event will also report the connection ID for the connection associated with the network interface, and the ID for the last rediction device.

An ECMA-323 based instance document example is as follows:

```
<NetworkReachedEvent>
    <monitorCrossRefID>99</monitorCrossRefID>
    <outboundConnection>
        <callID>2</callID>
        <deviceID>023</deviceID>
    </outboundConnection>
    <networkInterfaceUsed>
        <deviceIdentifier>023</deviceIdentifier>
    </networkInterfaceUsed>
    <callingDevice>
        <deviceIdentifier>12345</deviceIdentifier>
    </callingDevice>
    <calledDevice>
        <deviceIdentifier>18005551212</deviceIdentifier>
    </calledDevice>
    <lastRedirectionDevice>
        <notRequired/>
    </lastRedirectionDevice>
    <cause>normal</cause>
</NetworkReachedEvent>
```

The corresponding C# structure is:

```
public NetworkReachedEventArgs: CSTAEventArgs
{
    Connection OutboundConnection;
    Device    NetworkInterfaceUsed;
    Device    CallingDevice;
    Device    CalledDevice;
```

```
    Device    LastRedirectedDevice;
    ...
}
``` b.3. Delivered Event

The Delivered event is similar to the example shown in "Notification of an inbound alerting connection", except here it means a connection has been made with the recipient and the connection is in alerting: The event cause for outbound call is usually EventCause.NetworkSignalling.

b.4. Established Event

The Established event is raised when CSTA detects the recipient and picks up the phone. This is not always possible if the recipient is not on the same network as the caller.

The structure for the Established event is very similar to Delivered event, and therefore an example is not shown here.

Single Step Transfer or Deflect Call

The CSTA Single Step Transfer service transfers a call from a device to another device, disconnecting existing connection in the process. The Deflect Call service performs the similar task, one most notable difference being that Deflect Call service retains the same Call ID after transfer, while a new one will be assigned for the Single Step Transfer. Conceptually, Single Step Transfer is more a device based operation, whereas the Deflect Call is more a connection oriented one.

a. Service Requests

The mandatory parameters for the service are the connection to be transferred, and the device ID for the transfer target. An ECMA-323 based instance document example is as follows:

```
<SingleStepTransferCall>
    <activeCall>
        <callID>xxx</callID>
        <deviceID>12345</deviceID>
    </activeCall>
    <transferredTo>333333</transferredTo>
</SingleStepTransferCall>
```

The service response returns the connection where the call is transferred to. An ECMA-323 based instance document is as follows:

```
<SingleStepTransferCallResponse>
    <transferredCall>
        <callID>yyy</callID>
        <deviceID>333333</deviceID>
    </transferredCall>
</SingleStepTransferCallResponse>
```

Similarly, an ECMA-323 based instance document for Deflect Call service may be:

```
<DeflectCall>
    <callToBeDiverted>
        <callID>1</callID>
        <deviceID>22343</deviceID>
    </callToBeDiverted>
    <newDestination>333333</ newDestination>
</DeflectCall>
```

Because there is no mandatory parameter in the response, the ECMA-323 based instance document for Deflect service response can be as simple as

```
<DefletCallResponse/>
```

The equivalent service for Single Step Transfer is modelled as a method on the Device object. As a result, a C# sample code may appear as newDestination=myProvider.GetDevice ("333333");
    newConnection=myDevice.SingleStepTransfer(newDestination);

Because Deflect Call is more a connection oriented operation, the service is modelled as a method on the Connection object. A C# sample is as follows:
    myConnection.Deflect(newDestination);

b. Notification Events

In addition to the service response for Single Step Transfer where the application can obtain the new connection for the transferred call, CSTA also raises event on the device to signal its call has been transferred and connection severed. An ECMA-323 based instance document for the Transferred event is:

```
<TransferedEvent>
    <monitorCrossRefID>99</monitorCrossRefID>
    <primaryOldCall>
        <callID>xxx</callID>
        <deviceID>12345</deviceID>
    </primaryOldCall>
    <transferringDevice>
        <deviceIdentifier>12345</deviceIdentifier>
    </transferringDevice>
    <transferredToDevice>
        <deviceIdentifier>333333</deviceIdentifier>
    </transferredToDevice>
    <transferredConnections>
        <connectionListItem>
            <oldConnection>
                <callID>xxx</callID>
                <deviceID>12345</deviceID>
            </oldConnection>
        </connectionListItem>
    </transferredConnections>
    <cause>singleStepTransfer</cause>
</TransferedEvent>
```

The equivalent structure in C# can be modelled as

```
public TransferredEventArgs: CSTAEventArgs
{
    Connection      PrimaryOldCall;
    Device          TransferringDevice;
    Device          TransferredToDevice;
    ConnectionList  TransferredConnections;
}
``` where the ConnectionList is a property that implements System.Collections.IList interface. If the call is moved using the Deflected Call service, a Diverted event will be raised. An ECMA-323 based instance document is

```
<DivertedEvent xmlns="http://www.ecma.ch/
        standards/ecma-323/csta/ed2">
    <monitorCrossRefID>99</monitorCrossRefID>
    <connection>
        <callID>xxx</callID>
        <deviceID>12345</deviceID>
    </connection>
```

```
        <divertingDevice>
          <deviceIdentifier>12345</deviceIdentifier>
        </divertingDevice>
        <newDestination>
          <deviceIdentifier>333333</deviceIdentifier>
        </newDestination>
        <cause>redirected</cause>
      </DivertedEvent>
``` and the corresponding C# event argument is

```
      public DivertedEventArgs : CSTAEventArgs
      {
             CSTA.Connection    Connection;
             CSTA.Device        DivertingDevice;
             CSTA.Device        NewDestination;
             ...
      }
```

Single Step Conference or Join Call

It is quite common that another party must be added to the call. This operation may be achieved through either Single Step Conference or Join Call service in CSTA. Although the outcome may appear similar, Single Step Conference is conceptually more like adding a device to an existing connection, whereas Join Call, adding a connection to a device.

Both services allow the app to specify the participation type of the added device. The possible types include active and silent: Active participation, which is default, allows the new device to receive and send audio to the call, while silent participation allows only receiving audio from the call.

Because the Join Call service functions like making a new connection from a device to a call, the service allows the application to specify AutoOriginate type as in the case for Make Call.

a. Service Requests

The mandatory parameters for Single Step Conference are the IDs for the added device and connection. An ECMA-323 based instance document is

```
      <SingleStepConferenceCall>
        <activeCall>
          <callID>1</callID>
          <deviceID>22343</deviceID>
        </activeCall>
        <deviceToJoin>55555</deviceToJoin>
      </SingleStepConferenceCall>
```

The service response returns the new connection being created for the new device:

```
      <SingleStepConferenceCallResponse>
        <conferencedCall>
          <callID>1</callID>
          <deviceID>55555</deviceID>
        </conferencedCall>
      </SingleStepConferenceCallResponse>
```

The service is modelled as a method on the Connection object 402 for which the new device will be added. It returns the new connection established for the new device, as in the C# sample below:
  newdevice=myProvider.GetDevice("55555");
  newConnection=myConnection.SingleStepConference (newdevice);

The mandatory parameters for Join Call are the same, as the service response. The ECMA-323 examples are therefore omitted here. However, this service is modelled as a method on the Device object 406 to be added to the call. The corresponding C# code is therefore somewhat different in that one has to obtain the object representing the added device first:
  newConnection=newDevice.Join(myConnection);

b. Notification Event

As a result of Single Step Conference or Join Call, the Conferenced event may be raised to indicate a new device has been added to the call, after which othe events such as Established event may follow when the new device answers the call.

An ECMA-323 based instance document for Conferenced event is as follows:

```
      <ConferencedEvent>
        <monitorCrossRefID>99</monitorCrossRefID>
        <primaryOldCall>
          <callID>1</callID>
          <deviceID>22343</deviceID>
        </primaryOldCall>
        <conferencingDevice>
          <deviceIdentifier>22343</deviceIdentifier>
        </conferencingDevice>
        <addedParty>
          <deviceIdentifier>55555</deviceIdentifier>
        </addedParty>
        <conferenceConnections>
          <connectionListItem>
            <newConnection>
              <callID>1</callID>
              <deviceID>22343</deviceID>
            </newConnection>
            <endpoint>
              <deviceID>22343</deviceID>
            </endpoint>
          </connectionListItem>
          <connectionListItem>
            <newConnection>
              <callID>1</callID>
              <deviceID>33333</deviceID>
            </newConnection>
            <endpoint>
              <deviceID>33333</deviceID>
            </endpoint>
          </connectionListItem>
          <connectionListItem>
            <newConnection>
              <callID>1</callID>
              <deviceID>55555</deviceID>
            </newConnection>
            <endpoint>
              <deviceID>55555</deviceID>
            </endpoint>
          </connectionListItem>
        </conferenceConnections>
        <cause>singleStepConference</cause>
      </ConferencedEvent>
```

The corresponding structure in C# is

```
      public ConferencedEventArgs : CSTAEventArgs
      {
             Connection       PrimaryOldCall;
             Device           ConferencingDevice;
             Device           AddedParty;
             ConnectionList   Connections;
             ...
      }
```

Illustrative Examples for Interactive Voice Functions

This section provides contrasting ECMA-323 based instance documents and the corresponding C# examples for interactive voice functions. The examples include:
- obtaining an object;
- simple prompt playback;
- advanced prompt playback using subqueue;
- prepare speech recognition;
- concurrent DTMF and speech recognition; and
- concurrent speaker verification alongside with speech recognition Obtaining an Object A Prompt object can be instantiated in C# as Prompt myPrompt=new Prompt( );
or obtained through Get Switching Function Devices service. The following ECMA-323 based instance document uses this service to obtain a collection of devices that can provide the Prompt functionality:

```
<GetSwitchingFunctionDevices>
    <requestedDeviceCategory>Prompt</requestedDevice
        Category>
</GetSwitchingFunctionDevices>
```

The corresponding C# sample would appear like the following:

System.Collection prompts=myProvider.GetDevices(DeviceCategory.Prompt);

where public enum DeviceCategory={ACD, GroupACD, GroupHunt, . . . , VoiceUnit, Listener, Prompt, DTMF, PromptQueue};

Attaching the Audio

The voice devices interact with the callers via voice and therefore must be associated with a CSTA Connection before their services can be utilized. The CSTA Join Call or Single Step Conference Call services described above can be used to indicate the connection for the interactive voice devices to send or draw audio from. For example, a Prompt object 414 can be attached with an audio channel for playback using either promptConnection=myConnection.SingleStep Conference(myPrompt); or
    myPrompt.Join(myConnecction);

Note that it is typical that each interactive voice object is narrowly constructed to handle a single audio channel, i.e., one Connection. If this is the case, the above step can be combined with object instantiation as above, as the following example demonstrates:

myPrompt=new Prompt(myConnection);

It is, however, possible to share a device with multiple connections because the majority of interactive voice services and events are connection oriented. This advanced scenario is further discussed below.

Simple Prompt Playback

The Start service can be used to play a text to speech synthesized voice. The mandatory parameter for the service is the connection to which the voice will be played. Optionally, the service accepts a string that represents the text to be synthesized.

The ECMA-323 based instance document for saying the sentence "Thank you for calling!" is as follows:

```
<Start>
    <overConnection>
        <callID>xxx</calledID>
        <deviceID>12345</deviceID>
    </overConnection>
    <text>Thank you for calling!</text>
</Start>
```

There is no mandatory parameter for the service response. As a result, the response can be as simple as:

<StartResponse/>

The service is common to all the Interactive Voice Functions and hence can be modelled as a method in an interface that all the interactive voice objects implement. Note that since all the Interactive Voice Functions can be linked to at most one Connection, the connection ID associated with each Interactive Voice Function can be encapsulated into the corresponding object. As a result, a C# example is:

myPrompt.Start ("Thank you for calling!");

The application may place a monitor on the device to receive the CSTA Completed or Bookmark Reached event. This can be achieved following the same approach in "Placing a monitor on a device." As is in the previous case, the mandatory monitor cross reference ID and connection ID can be entirely encapsulated in the object model. Accordingly, the CSTAEventArgs can be used for Completed event where the Bookmark Reached event contains the additional bookmark:

```
public BookmarkReachedEventArgs : CSTAEventArgs
{
    string      Bookmark;
}
```

Advanced Prompt Playback

It is very common that an application would like to queue up multiple prompts and play them together. Prompt Queue 418 and the corresponding Queue service may be used for this kind of scenarios. The Prompt Queue device can be obtained and attached to the call in the same manner as shown in "Obtaining an object" and "Attaching the audio". In the following, a scenario is demonstrated where a filler prompt is continuously played to the caller when the application retrieves relevant data, and is only stopped while the app is ready to present the data to the caller.

a. Set Voice Attribute for the Filler Prompt

In this example, the filler prompt is a combination of synthesized text and music. This can be achieved by setting the innerXML attribute of a Prompt using the Set Voice Attribute service. The ECMA-323 based instance document is

```
<SetVoiceAttribute>
    <connection>
        <callID>xxx</callID>
        <deviceID>12345</deviceID>
    </connection>
    <innerXML>
        <speak xmlns="http://www.w3.org/
            2001/10/synthesis">
            Please stay on the line while
            I retrieve the data.
            <audio src="urn:my audio source"/>
        </speak>
    </innerXML>
</SetVoiceAttribute>
```

There is no mandatory parameter for positive ackowledgement. As a result, the service response can simply be
<SetVoiceAttributeResponse/>

Voice Attributes are modelled as object properties. Setting and reading the properties are equivalent to issue the Set Voice Attribute and Query Voice Attribute service requests, respectively. As a result, the corresponding C# example is
fillerPrompt.InnerXML="<speak . . . > . . . </speak>";

The content of the innerXML attribute is a string representation of W3C SSML. At this time, there is no native SSML tag to refer to external contents. Such a mechanism, however, is available in the SALT specification through the use of the <content> tag. In addition to the inline SSML in the above example, application may also specify the playback content in reference. For example, in ECMA-323, one may specify the following:

```
<SetVoiceAttribute>
    <connection>
        <callID>xxx</callID>
        <deviceID>12345</deviceID>
    </connection>
    <innerXML>
        <contentxmlns="http://
            www.saltforum.org/..."
            src="realdocument.ssml"/>
    </innerXML>
</SetVoiceAttribute>
```

Similarly in C#:
fillerPrompt.innerXML="<content xmlns=' . . . ' src=' . . . '/>";

b. Play the Filler Prompt

The audio in the above example can be connected to a broadcast source where music is continuously played. Such an arrangement will lead to a prompt that does not end until explicitly stopped, using the method demonstrating in "Stop the filler prompt" below for example. Another common use case, though, is to connect the audio to a fixed length pre-recorded waveform so that the application can decide how many filler instances should be played while the data is being prepared. Each instance of playback can be sent to the Prompt Queue using the Queue service. In ECMA-323, the following sends an instance to the Prompt Queue 418:

```
<Queue>
    <overConnection>
        <callID>xxx</callID>
        <deviceID>12345</deviceID>
    </overConnection>
</Queue>
```

There is no mandatory parameter for the positive acknowledgement. The response can be as simple as
<QueueResponse/>

When multiple instances are needed, the above ECMA-323 can be repeated as many times as appropriate. The corresponding example in C# for two instances is
fillerPrompt.Queue( );
fillerPrompt.Queue( );

After queue is prepared, the playback may be initiated with the Start service described in "Simple prompt playback", using the connection ID for either the Prompt Queue or the filler prompt as the parameter. In C#, an example is as follows:
myPromptQueue.Start( );

c. Prepare the New Prompt

After the application fetched the data, a new prompt can be created to present the data to the caller. The application can follow the examples in "Obtaining an object" and "Attaching the audio" to set up the prompt, using examples in "Set Voice Attribute for the filler prompt" for the content if necessary. Finally, the Start service can be used to place the new prompt to the Prompt Queue to mark the new prompt as ready. All these steps can take place while the filler prompt is still playing.

d. Stop the Filler Prompt

As the new prompt is ready for playback, the Stop service can be used to remove the unfinished portion of the filler prompt. In ECMA-323, the mandatory parameter is the connection ID for the Prompt Queue:

```
<Stop>
    <overConnection>
        <callID>xxx</callID>
        <deviceID>23456</deviceID>
    </overConnection>
</Stop>
```

Since there is no mandatory parameter, the service response can be
<StopResponse/>
The equivalent C# example is
myPromptQueue.Stop( );

Simple Speech Recognition

To utilize the interactive voice services for speech input processing such as speech recognition, the application has to first obtain the device and connection, setting the grammars for recognition, and attaching event handlers to receive notifications. Unlike the prompt playback, the last step is required for speech input services.

a. Obtain Device and Attach Audio

The manner to obtain a Listener device and attach a connection to it is identical to Prompt case in ECMA-323 where applications may use the CSTA services demonstrated in "Obtaining an object" and "Attaching the audio". Equivalent C# code which models Listener as add-on to CF may look like
myListener=new Listener (myConnection);

b. Set Up Recognition Grammars

Similar to setting the text for prompt playback, the recognition grammars are set using the Set Voice Attribute service in CSTA shown in "Set Voice Attribute for the filler prompt". An example in ECMA-323:

```
<SetVoiceAttribute>
    <connection>
        <callID>xxx</callID>
        <deviceID>23456</deviceID>
    </connection>
    <grammars>
        <grammar name="general">
            <grammar xmlns="http://
                www.w3.org/2001/06/grammar" ...>
                <rule name="start">
                    <one-of>
                        <item>help</item>
                        <item>operator</item>
                    </one-of>
                </rule>
            </grammar>
        </grammar>
        <grammar name="main" src="http://mygrammar..."/>
    </grammars>
</SetVoiceAttribute>
```

Note that, as shown in the above example, the individual grammar in the Grammars collection can be either a W3C SRGS inline grammar or a URI reference. As a result, the Grammars collection is modelled as an object property of the type System.Collections.IDictionary in ECMA-335. Two additional objects, SrgsGrammar and Uri Grammar, are also provided to model each type of the grammars. The corresponding C# code equivalent to the ECMA-323 based instance document above is:

myListner.Grammars.Add("general", new SrgsGrammar ("<grammar xmlns . . . "));
myListner.Grammars.Add("main", new Uri ("http://my-grammar . . . "));

c. Attach Event Handlers and Start Recognition

Events are the mechanism for the application to obtain recognition results. A monitor therefore must be placed on the device before the CSTA Start service is issued to kick off the recognition. The ECMA-323 examples for placing a monitor and issuing the Start request are shown in "Placing a monitor on a device" and "Simple prompt playback."

When a sentence is recognized, the Recognized event is raised. An ECMA-323 based instance document that recognizes the caller's sentence "check email from John Smith" can be as follows:

```
<RecognizedEvent>
    <monitorCrossRefID>123</monitorCrossRefID>
    <overConnection>
        <callID>xxx</callID>
        <deviceID>23456</deviceID>
    </overConnection>
    <result>
        <SML confidence="0.7" text="check email from
            john smith">
            <checkEmail confidence="..." text=...>
                <sender confidence="0.8" text="john
                    smith">
                    <name>John Smith</name>
                    <email>johns</email>
                </sender>
            </checkEmail>
        </SML>
    </result>
    <text>check email from john smith</text>
</RecognizedEvent>
```

The equivalent information is reported back to the application in the following object:

```
public class RecognizedEventArgs: CSTAEventArgs
{
    string    Result;
    string    Text;
}
```

The result string can be converted into a System.Xml.XmlDocument, using the LoadXml method in ECMA-335, for example.

To receive events in the object model, the application has to attach the event handlers and activate the monitor as shown in "Placing a monitor on a device":

myListner.Recognized+=new RecognizedEventHandler (myHandler);
. . .
myListner.MonitorStart( );

A sample code to obtain the sender's email address, for example, can be as follows:

```
void myHandler(object sender, RecognizedEventArgs e)
{
    System.Xml.XmlDocument res = new
        System.Xml.XmlDocument(e.Result);
    string target =
        res.SelectSingleNode("/*/email").
        InnerText;
    ...
}
```

Simultaneous DTMF and Speech Recognition

Callers using telephone have two modalities to interact with automatic agents: spoken language and DTMF touch tones. While the former offers a potentially richer expressive power and more natural user experience, the latter proves more robust against background noise and user variations.

In addition to the speech modality using the Listener demonstrated above, CSTA also provides touch tone parsing services via DTMF. Using DTMF follows largely the same process as speech: allocating a DTMF device with the corresponding audio channel, attaching the grammar collection and event handlers, and finally using the CSTA Start service to start the processing. The example is almost identical to "Simple Speech Recognition" and is therefore omitted here.

The DTMF and speech modalities can be used at the same time that allows the caller to use either speech or DTMF in responding to the automatic agent. The process to set this up is straightforward: a Listener and a DTMF device will be joined to the same call, and two Start service requests are issued in tandem, one using the connection ID for the Listener and the other, for the DTMF. A C# sample is as follows:

myListener=new Listener(myConnection);
myListener.Grammars.Add("main", new UriGrammar (" . . . "));
myListener.RecognizedEvent+=new RecognizedEvent Handler(myHandler);
myListener.NotRecognizedEvent+=new NotRecognized EventHandler(myNoHandler);
myDtmf=new Dtmf(myConnection);
myDtmf.Grammars.Add ("main", new UriGrammar (" . . . "));
myDtmf.RecognizedEvent+=new RecognizedEvent Handler(myHandler);
myDtmf.NotRecognizedEvent+=new NotRecognized Event Handler(myNoHandler);
. . .
myListener.Start( );
myDtmf.Start( );
. . .

CSTA requires the interactive voice devices to coordinate their processings. For instance, when it becomes clear that the caller has chosen one input modality over the other, the unchosen device will automatically cease its operation (see 6.2 in ECMA-269).

Simultaneous Speech Recognition and Speaker Verification

In addition to activating multiple input modalities, CSTA also allows to initiating multiple functions of the speech input modality. For example, it is possible to overlay speaker verification on top of a speech recognition session where the same audio collected from the caller is used for both purposes. The steps needed are similar to those demonstrated in "Simultaneous DTMF and speech recognition", with the exception that only one Start service is needed for the devices of the same modality.

It is out of scope how the multiple functions of the speech modality are made available. Typically, the application may obtain the resource to perform a specific function either by using the CSTA capability exchange services (Claus 13, ECMA-269), or through prearranged provisioning of device IDs. When interactive voice SRFs are provided more like an add-on to the CF, it is common that an additional attribute, called server, for the Listener device is introduced so that a URI for the function provided by the device can be specified. In C# example, myRecognizer=new Listener( );
    myRecognizer.Server=new System.Uri("sip: mySRServer");
    myRecognizer.Grammars.Add("recognition", new Uri-Grammar(" . . . "));
    // setting up other attributes of the speech recognizer
    // . . .
    myVerifier=new Listener( );
    myVerifier.Server=new System.Uri("sip:myVerifier");
    myVerifier.Grammars.Add("cohort", new UriGrammar (" . . . "));
    // setting up other attributes of the speaker verifier
    // . . .
    myRecognizer.Join(myConnection);
    myVerifier.Join(myConnection);
    myRecognizer.Start( );
    As in the case of "Simultaneous DTMF and speech recognition," the speech processings among the Listener devices joined to the same call are coordinated. The detail behaviours are specified in 6.2 of ECMA-269.

Sharing Interactive Voice Devices

It is possible that some interactive voice functions can be very resource demanding. Recognizing proper names from a large database, for example, usually requires a speech recognizer to load up a sizeable grammar. It is therefore beneficial to share such a device among multiple connections as appropriate.

The majority of voice services and events in ECMA-269 are connection oriented. Device sharing is therefore straightforward: Interactive Voice services take a connection ID as the mandatory parameter that defines which audio channel the service should be interacting with. Similarly, all Interactive Voice events report the connection ID that identifies which audio channel generates the event. ECMA-323 based instance document examples for device sharing would be identical to all the previous examples and are omitted here.

For object modeling where events and properties are encapsulated for the application developers for usability, extra cautions must be taken for such an advanced scenario. As mentioned in 7.2, for the most common usages where a voice object is usually constructed to handle one single audio channel, it is logical to encapsulate the primary connection the object is dealing with. Methods modeling the voice services can therefore require no extra arguments, as in the Start method shown above. This is not the case for sharing because the connection must be explicitly specified in the service request.

To be specific, the following sample shows how a device can be shared by two connections, using either Single Step Conference or Join Call service:

myIVConnection1=myConnection1.SingleStep Conference(myRecognizer);
    . . .
    myIVConnection2=myRecognizer.Join(myConnection2);
    . . .

To invoke the Start service in this case, the connection object must be explicitly specified:

myRecognizer.Start(myIVConnection1);
    . . .
    myRecognizer.Start(myIVConnection2);
    myRecognizer.Cancel(myIVConnection1);
    . . .

Similarly, to handle events under the device type monitoring, the programmer can usually ignore the sender argument when the object is constructed to service its primary connection. Under the sharing scenario, the connection that causes the event must be explicitly inspected:

```
void myHandler(object sender, RecognizedEventArgs
args)
{
    try {
        Connection target = (Connection) sender;
        if (target == myIVConnection1) {
            // perform tasks for connection 1
        } else if (target == myIVConnection2) {
            // perform tasks for connection 2
        }
    } catch (...) {
        ...
    }
}
```

A Comparison Between CSTA and SALT 1.0

CSTA interactive voice SRF traces its root to SALT 1.0. While adapting SALT 1.0 for CSTA, many identifier name changes are needed for better compliance with the naming guideline of ECMA-335. In this annex, two simple C# examples, one for speech recognition and the other for synthesis, are shown to further demonstrate the transition path from SALT 1.0 to CSTA. Although SALT can be embedded into any XML document to provide speech services, the examples below focus on the environment of HTML with ECMAScript where SALT is commonly used.

Speech Input

In SALT 1.0, a speech recognizer is obtained using the <listen> tag:

```
<listen id="myRecognizer"
    mode="single"
    initialtimeout="500"
    onreco="handler1( )"
    onnoreco="handler2( )"
    onsilence="handler3( )">
  <param name="server">sip:myserver</param>
  <grammar      name="global"
src="http://mygrammarsrc/... "/>
</listen>
```

The corresponding C# example is myRecognizer=new Listener( );
    myRecognizer.Mode=Listener.Mode.Single;
    myRecognizer.SilenceTimeout=500;
    myRecognizer.Recognized+=new RecognizedEvent Handler(handler1);
    myRecognizer.NotRecognized+=new NotRecognized Event Handler(handler2);
    myRecognizer.SilenceTimeoutExpired+=new SilenceTimeoutExpiredEventHandler(handler3);
    myRecognizer.Server=new System.Uri("sip:myserver");
    myRecognizer.Grammars.Add("global", new UriGrammar("http://mygrammarsrc/ . . . "));

// need to add CSTA connection to myRecognizer
In both cases, the recognition is kicked off using myRecognizer.Start( );
where C# and ECMAScript happen to have the same expression. As commented, the object model code needs to add a CSTA connection as an audio source for the recognizer. In SALT 1.0, this is automatically done by the browser.

Both SALT and CSTA object model use events to receive recognition outcome. As shown in the above examples, handlers must be attached before recognition starts. Note that SALT is designed to be environment agnostic. The event handling follows the existing mechanism of SALT's hosting environment. In HTML Document Object Model (DOM) where SALT is commonly hosted, event handlers are invoked without local arguments. Instead, the relevant information is kept in the window.event object, including the source element that raises the event. Application developers can inspect the contents of the object inside the respective event handler. For the last example, the handler for the recognition event can be authored in ECMAScript as follows:

```
function handler1 ( )
{
    var res = window.event.srcElement.recoresult; //
        SML document
    var transcript = window.event.srcElement.text; //
        transcription
    var temp = res.selectSingleNode("//name[@confidence
        > 0.5]");
        // use Xpath to retrieve the first node called
        'name' with
        // desired recognition confidence score
        ...
}
```

Note that ECMAScript is not a strongly typed language. Nevertheless, it should be understood that in the above example, the recognition result recoresult, an SML document, is defined as an XML DOM Node type by SALT specification so that the programming language independent DOM API, such as the select single node method demonstrated above, may be applied to query the data. Under CLI, however, the relevant information for each event is often passed on as an argument to the event handler. As a result, the developer can directly access this information without consulting any global variable, as shown below:

```
void handler1 (object sender, RecognizedEventArgs
args)
{
    XmlNode    res = args.Result;
    string     transcript = args.Text;
    XmlNode    temp =
res.SelectSingleNode("//name[@confidence > 0.5]");
    ...
}
```

Speech Output
In SALT 1.0, a prompt is declared using the <prompt> tag:

```
<prompt id="myPrompt"
    bargein="true"
    onbargein="handler1( )"
    onbookmark="handler2( )"
    oncomplete="handler3( )">
```

```
<cotent src="ding.wav"/> <mark name="first"/>
Thank you for calling! <mark name="second"/>
How may I help you?
</prompt>
```

The corresponding C# example is
  myPrompt=new Prompt( );
  myPrompt.AutoInterruptible=true;
  myPrompt.BargeinDetected+=new BargeinDetectedEventHandler(handler1);
  myPrompt.BookmarkReached+=new BookmarkReachedEventHandler(handler2);
  myPrompt.Completed+=new CompletedEventHandler(handler3);
  myPrompt.InnerXml="<content src="ding.wav"/> <mark name="first"/>"+"Thank you for calling! <mark name="second"/>"+"How may I help you?";
  // need to add a connection
In either case, the prompt can be sent to Prompt Queue using
  myPrompt.Queue( );
  or immediately started using myPrompt.Start( );
  where C# and ECMAScript have, again, the same expression.

Although the present invention has been described with reference to particular embodiments, workers skilled in the art will recognize that changes may be made in form and detail without departing from the spirit and scope of the invention.

What is claimed is:

1. A computer readable storage medium having instructions that, when implemented on a computer cause the computer to process information, the instructions comprising:
   an object-oriented module comprising a declarative logic module defining a first object and a procedural logic module defining a second object wherein the procedural logic module includes a reference to a class that is declared in detail in the declarative logic module rather than the procedural logic module;
   a non-object-oriented service model based logic module comprising a service schema and defining actions to be performed on at least one of the first and second objects with a reference to said at least one of the declarative or procedural logic modules;
   a converter converting the service schema into an object model for at least one of the first and second objects and having a mapping, the mapping correlating references of the service schema to references in the object model including correlating constituents of the object model with parameters of the service schema and correlating methods operable on the constituents of the object model with service methods operable on the parameters of the service schema;
   and an interacting application operable with the object model, wherein the converter is further converting operations of the interacting application into operations for the non-object-oriented service model based logic module.

2. The computer readable storage medium of claim 1 wherein the procedural logic module defines actions to be performed on the first object with a references to the class declared in the declarative logic module.

3. The computer readable storage medium of claim 1 wherein the instructions further comprise: a second procedural logic module defining actions to be performed on the first object with references to the class declared in declarative logic module.

4. The computer readable storage medium of claim 1 wherein the declarative logic module defines a schema of related objects in a hierarchical structure.

5. A method for compiling an application, comprising:
provided a non-object-oriented service model based logic module comprising a service schema;
converting the service schema into an object-oriented object model using a mapping, the mapping correlating references of the service schema to references in the object model including correlating constituents of the object model with parameters of the service schema;
schema and correlating methods operable on the constituents of the object model with service methods operable on the parameters of the service schema:
identifying a designation within non-object-oriented service model based logic module corresponding to a declarative logic module and a procedural logic module, wherein the procedural logic module includes a reference to a class that is declared in more detail in the declarative logic module than in the procedural logic module;;
accessing an object of the object model within said at least one of the declarative logic module or the procedural logic module to perform actions in the non-object-oriented service model based logic model;
comprising providing an interacting application operable with the object model;
and converting operations of the interacting application into operations for the non-object-oriented service model based logic module using a second mapping, the second mapping being adapted to convert operations of the interacting application with the object model into operations for the non-object-oriented service model based logic module.

6. The method of claim 5 and further comprising accessing the object within the declarative logic module to perform actions in the procedural logic module.

7. A method of developing an interacting application for a non-object-oriented service model based application, the method comprising: accessing a schema of the non-object-oriented service model based application;
generating an object-oriented object model in accordance with the schema by converting the schema into the object model using a mapping, the mapping correlating references of the service schema to references in the object model including correlating constituents of the object model with parameters of the schema and correlating methods operable on the constituents of the object model with service methods operable on the parameters of the schema, wherein details of the object model are declared with a declarative programming language;
developing an interacting application operable with the object model, wheein an action is defined in a procedural programming language, and wherein the action includes a reference to a class that is declared in more detail in the declarative logic module than in the procedural programming language;
and converting with a processor operations of the interacting application with the object model to interface with the non-object-oriented service model based application.

8. The method of claim 7 wherein the interacting application comprises a procedural based logic module application.

9. A method of developing an interacting service model based application for an object-oriented application comprising of a declarative model based application and a procedural model based application, the method comprising:
accessing an object model wherein more details of the object model are declared with a declarative programming language than with a procedural programming language;
generating non-object-oriented service schema in accordance with the object model;
developing a non-object-oriented interacting service model based application operable with the service schema; and
converting with a processor operations of the non-object-oriented interacting service model based application, using a mapping, into the object model to interface with at least one of the declarative model based application or the procedural model based application, the mapping correlating references of the service schema to references in the object model including correlating constituents of the object model with parameters of the service schema and correlating methods operable on the constituents of the object model with service methods operable on the parameters of the service schema.

10. The method of claim 7 wherein the interacting application comprises actions provided in a declarative based logic module and actions provided in a procedural based logic module.

11. The computer readable storage medium of claim 1 having instructions further comprising an interacting application operable with the object model.

12. The computer readable storage medium of claim 11 having instructions further comprising a second converter comprising a second mapping adapted converting operations of the interacting application with the object model into operations for the non-object-oriented service model based logic module.

* * * * *